United States Patent
John et al.

(10) Patent No.: US 10,481,620 B2
(45) Date of Patent: Nov. 19, 2019

(54) PNEUMATIC INFLATION SYSTEM

(71) Applicant: Goodrich Corporation, Charlotte, NC (US)

(72) Inventors: Poly Puthur John, Karnataka (IN); Ashish Kumar Agarwal, Karnataka (IN)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 15/709,715

(22) Filed: Sep. 20, 2017

(65) Prior Publication Data
US 2018/0341279 A1 Nov. 29, 2018

(30) Foreign Application Priority Data
May 26, 2017 (IN) .............................. 201711018614

(51) Int. Cl.
B64D 25/14 (2006.01)
G05D 7/06 (2006.01)
F16K 31/124 (2006.01)
F16K 17/40 (2006.01)
F17C 1/00 (2006.01)
B63C 9/19 (2006.01)
A62B 1/20 (2006.01)
B60C 29/00 (2006.01)

(52) U.S. Cl.
CPC ........... G05D 7/0676 (2013.01); B64D 25/14 (2013.01); F16K 13/04 (2013.01); F16K 17/403 (2013.01); F16K 31/124 (2013.01); F17C 1/005 (2013.01); A62B 1/20 (2013.01); B63C 9/19 (2013.01); B63C 9/24 (2013.01)

(58) Field of Classification Search
CPC ........ G05D 7/0676; F17C 1/005; B64D 25/14
See application file for complete search history.

(56) References Cited

U.S. PATENT DOCUMENTS

| RE30,552 | E | * | 3/1981 | Ludwig | F16K 24/04 137/468 |
| 4,476,937 | A | | 10/1984 | Rozniecki | |
| 4,500,014 | A | * | 2/1985 | Zimmerly | B63C 9/24 222/5 |
| 4,669,626 | A | * | 6/1987 | Mozley | F16K 17/1606 137/68.26 |
| 4,959,034 | A | * | 9/1990 | Wass | B63C 9/24 441/41 |
| 5,860,443 | A | | 1/1999 | Soemer et al. | |

(Continued)

FOREIGN PATENT DOCUMENTS

WO 2014018332 A1 1/2014

OTHER PUBLICATIONS

Search Report dated Oct. 18, 2018, EP Application No. 18174244.6, 7 pages.

Primary Examiner — Stephen P Avila
(74) Attorney, Agent, or Firm — Cantor Colburn LLP

(57) ABSTRACT

A valve includes a valve body, an inlet in the valve body in fluid communication with the gas and an outlet in the valve body, and a rupture disc in fluid communication with and between the inlet and the outlet that prevents fluid communication between the inlet and the outlet. The valve also includes a piston that is urged by a gas from the gas source to rupture the rupture disc to allow fluid communication between the gas source and the outlet.

18 Claims, 2 Drawing Sheets

(56) References Cited

U.S. PATENT DOCUMENTS

| | | |
|---|---|---|
| 6,089,403 A | 7/2000 | Mackal |
| 6,260,570 B1 | 7/2001 | Wass et al. |
| 7,878,215 B2 | 2/2011 | McLelland et al. |
| 2005/0098209 A1* | 5/2005 | Mackal .................... B63C 9/24 137/68.3 |
| 2005/0103379 A1 | 5/2005 | Sundholm |
| 2016/0008646 A1 | 1/2016 | Frasure et al. |
| 2017/0029081 A1* | 2/2017 | Michalski ................. B63C 9/19 |

\* cited by examiner

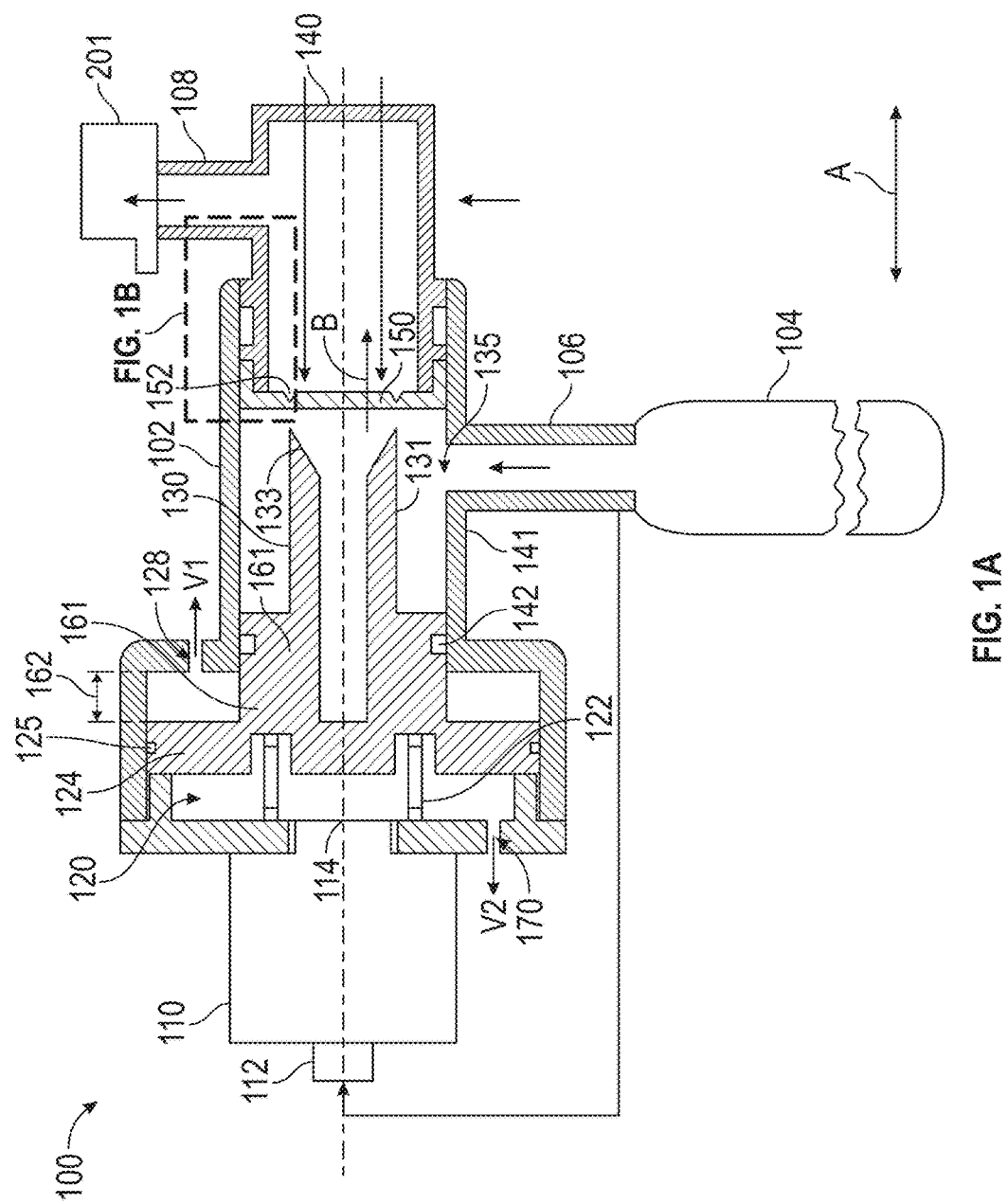

PNEUMATIC INFLATION SYSTEM

FOREIGN PRIORITY

This application claims priority to Indian Provisional Patent Application No. 201711018614 filed May 26, 2017, the entire contents of which is incorporated herein by reference.

BACKGROUND

The subject matter disclosed herein relates to inflation systems, and more particularly, to a system and a method for inflating an emergency evacuation device.

Typically, inflatable evacuation devices such as floats, slides, and rafts are utilized to provide for aircraft occupant evacuations. Inflatable evacuation devices often utilize inflation systems to allow for the devices to be stored in a packed state and then rapidly inflated in emergency situations. Often, inflation systems utilized in inflatable evacuation devices can leak over time, causing pack growth and pack drop. Leakage from the inflation systems into the packed inflatable evacuation device requires the replacement of the inflatable evacuation devices.

In more detail, pneumatic inflation system use high pressure stored gas, which needs to be discharged within specified time by the opening of a normally closed inflation valve. Typically, inflation valves are flow isolation valves actuated either by manual or electrical triggering. In operation, the inflation valve isolates the high pressure stored gas from the downstream inflatable pack. In the in-service conditions, the stored high pressure gas is effective up to the valve primary sealing, blocking the inlet-outlet flow path. The fluid leakage through this seal can be less than desirable. For instance, leaked gas flows down to the downstream inflatable if it is not vented leading to the aforementioned pack growth. Venting of this leaked gas to external ambient requires additional components which adds system complexity. Pack growth and drop both call for the replacement and maintenance of the inflatable pack assembly. This can lead to the inadvertent inflation and deployment in some instances.

BRIEF SUMMARY

According to one embodiment, an inflation system that includes a gas source and a valve is disclosed. The valve includes a valve body, an inlet in the valve body in fluid communication with the gas and an outlet in the valve body, and a rupture disc in fluid communication with and between the inlet and the outlet that prevents fluid communication between the inlet and the outlet. The valve also includes a piston that is urged by a gas from the gas source to rupture the rupture disc to allow fluid communication between the gas source and the outlet.

Also disclosed is a method to inflate an inflatable device. The method includes: providing a gas source in fluid communication with an inlet, preventing fluid communication between the inlet and an outlet via a rupture disc; urging a piston into the rupture disc via the pneumatic source; rupturing the rupture disc via the piston; and providing fluid communication between the pneumatic source and the inlet via the rupture disc.

In one embodiment, an inflatable system that includes an inflatable device having a device inlet, and an inflation system is disclosed. The inflations system includes a gas source and a valve. The valve includes a valve body, an inlet in the valve body in fluid communication with the gas and an outlet in the valve body, and a rupture disc in fluid communication with and between the inlet and the outlet that prevents fluid communication between the inlet and the outlet. The valve also includes a piston that is urged by a gas from the gas source to rupture the rupture disc to allow fluid communication between the gas source and the outlet.

A technical effect of the embodiments described above includes providing is a valve having zero internal leakage that can be used to in inflation systems.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

FIG. 1A illustrates a partial cross-sectional view of one embodiment of an inflation system for use with an inflatable evacuation device;

DETAILED DESCRIPTION

Figure 1B:
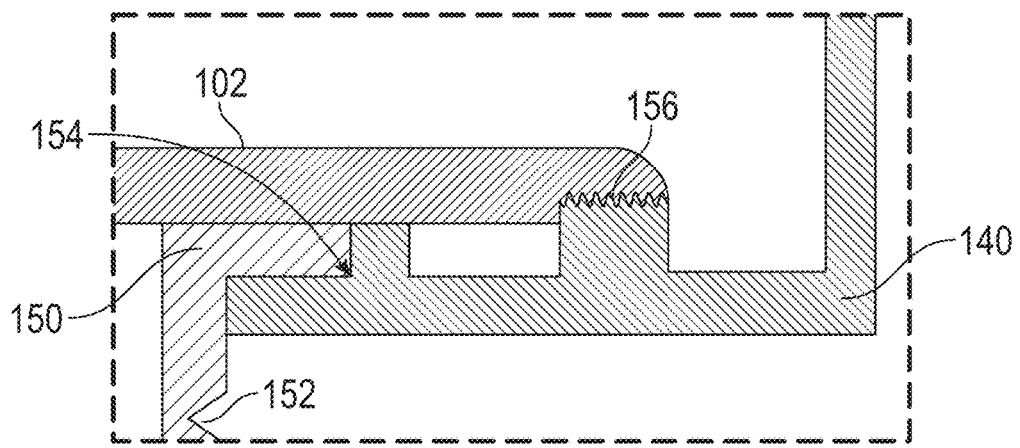
FIG. 1B is a detail view of the fusion weld and the threaded connection of the inflation system of FIG. 1A.

In the context of aircraft or other vehicle life rafts and floats, such emergency evacuation devices must last for a long time with minimum scheduled maintenance. As such, such systems need to include low or zero leakage inflation systems. Leakage is influenced by the sealing design type, sealing materials and the operating environments. The design parameters influencing the internal leakage need to be tightly controlled in the component processing to achieve valve assemblies meeting the required leak tightness. Disclosed herein is a valve having zero internal leakage features achieved by using fluid isolation rupture discs which can be retained by fusion welding them to an outer body (e.g., retainer body). To initiate the inflation, this disc is ruptured by a knife edge cutter tool (e.g., puncher) actuated by the electro-pneumatic action.

Referring now to the drawings, FIG. 1 an inflation system 100. The inflation system 100 can be part of an emergency evacuation system such as a life raft, a float or an evacuation slide. All of these evacuation systems include an inflatable element that, in operation, is connected to an outlet 108 of the inflation system. When needed, which is more fully explained below, gas contained in the gas bottle 104 is provided through the outlet 108 to the inflatable element 201 causing inflation of the inflatable element. The gas bottle 104 is an example of pneumatic source. The inflatable element 201 can be a life raft, a float or an evacuation slide or any other inflatable device.

The inflation system 100 includes a valve body 102. The valve body 102 includes an inlet 106 and the outlet 108. The gas bottle 104 is connected to the inlet 106 in a sealed manner to keep gas from escaping from the bottle as much as possible.

Located within the valve body 102 is a membrane 150. The membrane 150 prevents gas from the bottle 104 from reaching outlet 108. A solenoid valve 110 is connected to the valve body 102 and is used to cause certain other elements (e.g., knife edge piston 130) to puncture the member 150. In general, the solenoid valve 110 causes the knife edge piston 130 to rupture the membrane 150 when the valve is activated. Rupturing the membrane 150 allows the gas in the gas bottle 104 to travel from the inlet 106 to the outlet 108 and inflate the connected inflatable element.

The solenoid valve 110 is coupled to the valve body 102 and is a 2 position, 2 way normally closed in-line solenoid valve in one embodiment. The valve 110 includes an inlet 112 and an outlet 114. High pressure gas is drawn from the valve inlet 106 and is routed to the inlet 112 of solenoid valve. Upon electrical actuation, the solenoid valve 110 opens admitting high pressure gas into the valve body 102 and causing motion of the knife edge piston 130.

In more detail, the valve body 102 includes piston 130 disposed within it. The piston 130 includes a piston head 124 that is moveable retained in command cavity 120 of the valve body. In one embodiment, the piston head can move in the direction A shown in FIG. 1 within the command cavity 120. A sealing element such as an o-ring 125 may surround the piston head 124 to seal gas from one side of the piston head 124 from traveling to the other side.

The piston 130 also includes a knife end 131 that includes sharp edges 133 that can rupture membrane 150. The knife end 131 is contained and moves within the rupture cavity 135 of the valve body.

In normal operation, the pressure of the gas in the rupture cavity 135 is as the pressure of the gas in the gas bottle 104. This pushes the piston head 124 to the left in FIG. 1A. The piston 130 may include another o-ring 142 to seal gas in the rupture cavity 135.

After the solenoid is activated, gas is provided through the solenoid outlet to the command cavity 120 of valve body 102. The differential fluid pressure force moves the knife end 131 towards the membrane 150. The knife end 131 punctures the membrane and allows the gas to pass form the inlet 104 to the outlet 108.

Figure 2:
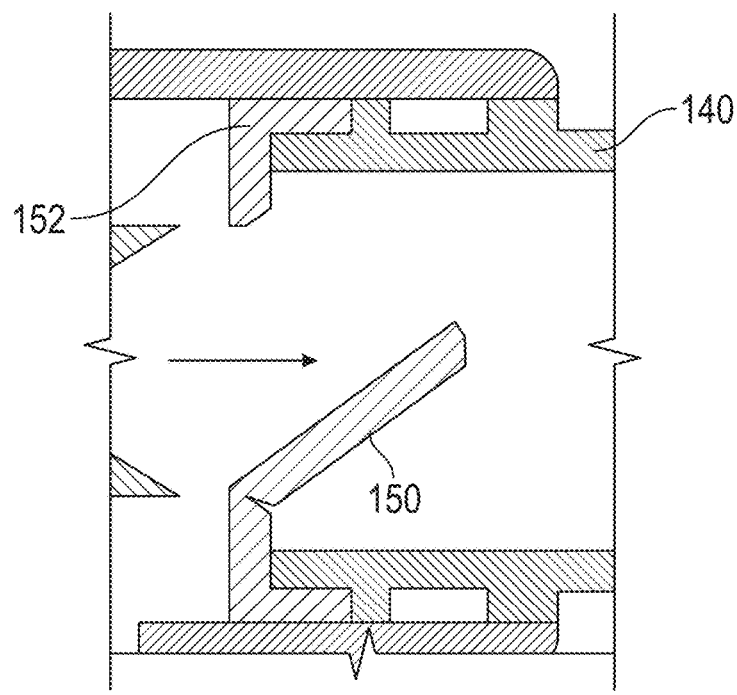
FIG. 2 is a pictorial view of the inflation system of FIG. 1A shown in a ruptured state.

The profile of the knife end 131 can be designed either to make full opening by dislodging the ruptured part of membrane 150 or to make an angular opening holding the partially ruptured part like a hinge assembly as shown FIG. 2.

In one embodiment, the knife end 131 is integral with the piston 130. The piston includes piston head 124 and inner piston head 161. As described above, each head includes radial seals 125, 142 to hold the fluid pressure. In the service condition, inner piston head seal 142 experiences the fluid pressure within the main body and the piston head seal 125 experiences the fluid pressure in the command cavity 120. The leakage through the inner piston head seal 142 is vented out through vent port 128. This pressure force retains the piston 130 in the initial position withstanding the vibration and shock loads. In the in-service condition, leaked gas of the solenoid valve 110 is vented out through vent port 170.

Springs 122 may also be provided in the command cavity and contacting the piston head 124 to provide for increased speed of rupturing action.

Opposite the solenoid, the valve body 102 includes a removable disk retaining body 140. The disk retainer body 140 can be coupled to and removed from the rest of the valve body 102 (e.g., from main body portion 131) due to a threaded connection 156. The connection between the disk retaining body 140 and the valve body 102 is best shown in FIG. 1B which is a detail of region B in FIG. 1A. Threaded connection 156 allows the disk retaining body 140 to be removed after each bursting of the membrane 150 (or solenoid) firing and the remains of used disc can be removed by conventional machining. For the repeated use, new membrane shall be used and welded with retainer body.

The membrane 150, as discussed above, blocks the path between the inlet 104 and the outlet 108. The membrane 150 may also be referred to as a rupture disk herein as it can be circular in one embodiment and is ruptured to allow for flow between the inlet 104 and the outlet 108. Edges of the rupture disk 150 are fusion welded to the retainer body 140 as shown by welds 154 in FIG. 1B. In the final use, gas bottle is pressurized and the disc is designed to be flat withstanding the pressure in the forward acting direction.

The amount of distance traveled by the piston 130 can be controlled by a stroke limit 162 between an edge of the piston head 130 and the valve body 102, With referent to FIGS. 1A and 1B, the rupture disk 150 can include indentations 152. The indentations 152 may align with the knife end 131 to allow for easier rupturing. In some cases the disc 150 can be designed with a slight reverse buckling. This induces tensile stress in the disc 150 and final bursting or rupturing occurs under the punching action of the knife end 131. Rupturing action in the tensile loading condition burst the disc with full opening without fragmentation. For a given disc 150 isolation sealing, strength is determined by the material used, thickness of material, manner in which disc is gripped or retained and the presence or absence of the initial surface imperfection and indentations 152 or scoring marks.

After firing of the solenoid 110 (e.g., the fully opened case), the ruptured portion of the disk 150 is retained within retainer body by action the fluid pressure force. Since the flow outlet 108 is located 90 degrees away from the central flow path (arrow B), the dislodged disc part does not get into the valve outlet path. For the case of angular opening which does not require complete rupturing, the cutting profile of tool shall be designed accordingly.

After the solenoid 110 is fired, it can be closed (e.g., reset) by disconnecting the electrical supply.

Parameters of the rupturing action involves the type of disc 150 and its initial indentations 152, design of the knife edge profile of the knife end 130, the differential pressure force acting on the puncture tool and the speed with which the differential force builds up to for the movement and puncturing action. Other design parameters includes the solenoid valve port size, solenoid valve opening response time, command cavity volume, spring force, oring sliding friction force, differential areas of the pistons and the travel distance of the puncher from the initial position. This component function as single action discharge valve with expendable rupture disc. The radial elastomer seals and the rupture disc need to be replaced after each firing.

Advantageously, one or more embodiments disclosed herein will not allow for internal leaking from the gas bottle 104 to the outlet 108.

After each disc rupturing, the disc 150 can be replaced with new disc which can be fusion welded to the retainer 140. Except the rupture disc and two piston seals, all other parts are re-usable. The rupturing action be made smooth and uniform by the suitable designing of knife edge profile. If required, the profile can be designed to have an angular opening of the valve by rupturing the disc partially (e.g., FIG. 2). Since the rupturing action involves tensile loading of the rupture disc, the disc gets ruptured without fragmentation. In the rupturing with the full opening, the dislodged or ruptured piece part does not interfere with flow path. This design does not permit internal leakage and performs as zero leakage inflation valve. This design can be adapted to function at elevated operating temperature also.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. An inflation system, comprising:
a gas source;
a valve including:
a valve body;
an inlet in the valve body in fluid communication with the gas source;
an outlet in the valve body;
a rupture disc in fluid communication with and between the inlet and the outlet, wherein the rupture disc prevents fluid communication between the inlet and the outlet; and
a piston, wherein the piston is urged by a gas from the gas source to initially rupture the rupture disc to allow initial and subsequent fluid communication between the gas source and the outlet.

2. The inflation system of claim 1, wherein the valve body includes a body portion and a disc retaining body connected to the body portion, the inlet being formed in the body portion and the outlet being formed in the disk retaining body.

3. The inflation system of claim 2, wherein the rupture disc is fusion welded to the disc retaining body.

4. The inflation system of claim 3, wherein the disc retaining body includes a threaded connection.

5. The inflation system of claim 1, wherein the rupture disc includes an indentation.

6. The inflation system of claim 1, further comprising a solenoid valve to selectively allow flow between the gas source and the rupture disk.

7. The inflation system of claim 6, wherein the solenoid valve selectively allows flow into a command cavity defined by the rupture member.

8. The inflation system of claim 1, wherein the piston includes a knife edge.

9. The inflation system of claim 1, wherein the gas source is a gas bottle.

10. A method to inflate an inflatable device, the method comprising:
providing a gas source in fluid communication with an inlet;
preventing fluid communication between the inlet and an outlet via a rupture disc;
urging a piston into the rupture disc by pressurizing the piston using gas from the gas source;
initially rupturing the rupture disc via the piston being pressurized by the gas from the gas source; and
providing initial and subsequent fluid communication between the gas source and the outlet via the rupture disc.

11. The method of claim 10, wherein the rupture disc is disposed in a disc retaining body.

12. The method of claim 11, further comprising fusion welding the rupture disc to the disc retaining body.

13. The method of claim 10, wherein the disc retaining body includes a threaded connection.

14. The method of claim 10, wherein the rupture disc includes an indentation.

15. The method of claim 10, further comprising selectively allowing flow between the pneumatic source and the rupture member via a solenoid valve.

16. The method of claim 15, further comprising selectively allowing flow into a command cavity defined by the rupture member via the solenoid valve.

17. An inflatable system, comprising:
an inflatable device having a device inlet, and
an inflation system, including:
a gas source;
a valve including:
a valve body;
an inlet in the valve body in fluid communication with the pneumatic source;
an outlet in the valve body;
a rupture disc in fluid communication with and between the inlet and the outlet, wherein the rupture disc prevents fluid communication between the inlet and the outlet; and
a piston, wherein the piston is urged by a gas from the gas source to initially rupture the rupture disc to allow initial and subsequent fluid communication between the gas source and the outlet.

18. The inflatable system of claim 17, wherein the inflatable device is selected from a group consisting of: a float, a slide, and a raft.

* * * * *